United States Patent [19]

Miyabayashi et al.

[11] Patent Number: 5,759,711
[45] Date of Patent: Jun. 2, 1998

[54] LIQUID-CIRCULATING BATTERY

[75] Inventors: Mitsutaka Miyabayashi; Kanji Sato; Masato Nakajima; Kouichi Furusato; Sumie Sekiguchi, all of Ibaraki-ken, Japan

[73] Assignee: Kashima-Kita Electric Power Corporation, Ibaraki-ken, Japan

[21] Appl. No.: 801,115

[22] Filed: Feb. 14, 1997

[30] Foreign Application Priority Data

Feb. 19, 1996 [JP] Japan .................. 8-030690

[51] Int. Cl.$^6$ .................. H01M 8/20
[52] U.S. Cl. .................. 429/15; 429/105; 429/249; 429/51
[58] Field of Search .................. 429/101, 105, 429/15, 50–52, 249, 254, 14, 17, 72; 29/623.1; 204/296

[56] References Cited

U.S. PATENT DOCUMENTS

| | | | |
|---|---|---|---|
| 4,784,924 | 11/1988 | Savinell | 429/15 |
| 4,786,567 | 11/1988 | Skyllas-Kazacos et al. | 429/19 |
| 5,496,659 | 3/1996 | Zito | 429/105 |

*Primary Examiner*—Anthony Skapars
*Attorney, Agent, or Firm*—Oblon, Spivak, McClelland, Maier & Neustadt, P.C.

[57] ABSTRACT

The present invention provides a liquid-circulating battery including a positive electrode, a negative electrode, a permeable membrane interposed between the positive and negative electrodes to hold the same in separated relation to each other and to partition the same into a positive chamber and a negative chamber, two porous liquid-permeable carbon electrodes disposed respectively in the positive and negative electrolytic solutions being circulated respectively into the positive and negative chambers such that an oxidation-reduction reaction occurs and causes charging and discharging, wherein the permeable membrane is an ion-exchange me membrane including as an ion exchanger layer a polymeric pellicle which results from crosslinking of a halogenated alkylated product of an aromatic polysulfone type polymer with use of a polyamine and which has an ion exchange capacity of 0.3 to 8.0 milliequivalent/gram of dry resin and a thickness 0.1 to 120 μm, said polysulfone type polymer having as a recurring unit a group represented at least by the following formula (I); and

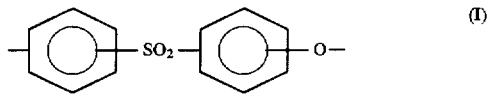

(I)

and wherein each of said positive and negative electrolytic solutions is an electrolytic solution having a vanadium ion concentration of 0.5 to 8 mols/liter.

20 Claims, 1 Drawing Sheet

1A,1'B = BIPOLAR PLATE
2 = POROUS CARBON ELECTRODE
3 = MEMBRANE
4 = SPACER
Lp(in) = ELECTROLYTIC SOLUTION INLET OF POSITIVE ELECTRODE
Lp(out) = ELECTROLYTIC SOLUTION OUTLET OF POSITIVE ELECTRODE
Ln(in) = ELECTROLYTIC SOLUTION INLET OF NEGATIVE ELECTRODE
Ln(out) = ELECTROLYTIC SOLUTION OUTLET OF NEGATIVE ELECTRODE 1A, 1'B = BIPOLAR PLATE
2 = POROUS CARBON ELECTRODE
3 = MEMBRANE
4 = SPACER
Lp (in) = ELECTROLYTIC SOLUTION INLET OF POSITIVE ELECTRODE
Lp (out) = ELECTROLYTIC SOLUTION OUTLET OF POSITIVE ELECTRODE
Ln (in) = ELECTROLYTIC SOLUTION INLET OF NEGATIVE ELECTRODE
Ln (out) = ELECTROLYTIC SOLUTION OUTLET OF NEGATIVE ELECTRODE

LIQUID-CIRCULATING BATTERY

BACKGROUND OF THE INVENTION

1. Field of the Invention

The present invention is directed to batteries of a redox flow type and in particular to such a battery which exhibits enhanced current efficiency and increased power efficiency as well as prolonged cycle of charge and discharge.

2. Description of the Related Art

Global warming has of late been taken as a serious problem which is caused by increased consumption of fossil fuels and hence by increased concentration of atmospheric carbon dioxide. In order to cope with this problem, solar batteries have been developed to a large extent for use as sources of clean energy. Such a solar battery, however, is literally unsuitable for electricity generation at night and during rainfall, and a demand has been voiced for a secondary battery of high performance for combined use with the solar battery.

On the other hand, because conventional power plants must be provided with power generation capacities that can satisfy the daily peak demands for electricity since the differences in demand such as for daytime and nighttime are so great, the operating efficiency of the generating equipments reduced. To attain improved operation, electric power once stored at night in a large-sized storage battery must be supplied for daytime consumption in order to level put operating load and raise the operating efficiency. Hence, a need exists for developing a battery of a large capacity for power storage.

There has arisen a further impetus to develop a secondary battery that has great output density and hence suitable as a source of electric energy for use in movable structures such as electric cars and the like.

Redox flow type batteries are promising as a new type of secondary battery. This battery is chargeable with good adaptation to the output voltage of a solar battery by means of a tap charger and moreover can be easily to be scaled up because of its relatively simple structure.

A redox flow type secondary battery is one in which charging and discharging are effected by taking advantage of an oxidation-reduction reaction, while positive and negative materials of a liquid nature for battery activity are circulated in a liquid-permeable electrolytic vessel. This type of secondary battery is advantageous in the following respect in contrast to conventional secondary batteries.

(1) The storage capacity can be increased simply by increasing the capacity of the storage container and the amount of active materials. The electrolytic vessel itself may be left intact so long as it does not need to be increased in regard to the capacity.

(2) The active materials of positive and negative electrodes can be maintained completely separate in the storage container. Consequently, self-discharging is less likely to intake place unlike a battery in which active materials are brought into direct contact with their respective electrodes.

(3) With a liquid-permeable type porous carbon electrode used in the secondary battery noted above, the ions of active materials can be easily subjected to charge and discharge reactions (electrode reactions). These reactions are attainable by simple interchange of the ions on electrode surfaces and hence are not apt to cause adverse deposits on the electrode as against a zinc-bromine battery wherein zinc ions are prone to be deposited.

Among conventional redox flow type secondary batteries, an iron-chromium battery is known which, however, warrants no practical application. This type of battery has the drawback that it involves low energy density as well as undesirable intermixing of iron and chromium through an ion-exchange membrane.

Alternatively, a redox flow type all-vanadium battery has been proposed as disclosed for instance in "J. Electrochem. Soc.", 133, 1057 (1986) and Japanese Patent Laid-open No. 62-186473. This prior art battery is advantageous, as compared to the iron-chromium battery, in that it has high electromotive force and a large battery capacity. Further, even where positive and negative electrolytic solutions get admixed with each other through a permeable membrane, such batteries can be easily regenerated by charging and the electrolyte can be completely closed off without reducing battery capacity. This is because such batteries are a one-element type electrolyte.

Reduced cell resistance, increased power efficiency in a wide range of current densities and prolonged cycle of charge and discharge have been sought to be obtained with respect to an all-vanadium redox flow type battery. However, such conventional batteries type fail to satisfactorily meet those requirements.

For instance, an ion-exchange membrane based on a styrene-divinyl benzene copolymer has mechanical strength that is too low to be molded with a small thickness. An all-vaniadium redox flow type battery using membranes such as a permeable membrane leads to an adverse rise in cell resistance and to a decline in power efficiency. Ion-exchange membranes are moreover prone to become oxidatively deteriorated by the action of pentavalent ions that are having generated in a charged state so that prolonged cycle of charging and discharging is unfeasible.

Another problem with the all-vanadium battery is that vanadium ions, anions resulting therefrom and water used as a solvent migrate, due to charging and discharging, from a positive electrode to a negative electrode or vice versa through the permeable membrane, thus bringing about shortened charge/discharge cycles.

Further, even though polysulfone type polymer based or fluorino type ion exchange membranes show improved resistance to oxidative deterioration from the action of pentavalent vanadium ions generated during charging, they have low current efficiency and also show a strong tendency to cause vanadium ions, anions derived therefrom and water used as a solvent to migrate in large amounts, as a result of charging and discharging, from either the positive to negative or negative to positive electrodes through the permeable membrane. Such liquid migration has a strong tendency to impair prolonged charge/discharge cycles.

For the above discussed reasons, there is a growing need for the development of a redox flow type battery that will provide enhanced power efficiency and extended charge/discharge cycles.

SUMMARY OF THE INVENTION

With particular regard to the aforementioned drawbacks of the prior art, the present inventors have intensively researched various redox flow type batteries and have now discovered a battery that exhibits reduced cell resistance, increased power efficiency and prolonged charge/discharge cycles.

The present invention, therefore, seeks to provide a new redox flow type battery which has significantly high current efficiency and power efficiency and which is sufficiently protected against adverse migration of, as a result of charging and discharging, vanadium ions, anions derived therefrom and water used as a solvent from the positive to negative or negative to positive electrodes through the permeable membrane, and hence is conducive to prolonged cycle life of charging and discharging.

More specifically, this invention provides a liquid-circulating battery comprising: a positive electrode; a negative electrode; a permeable membrane interposed between the positive and negative electrodes to hold the same in separated relation to each other and to partition battery into a positive chamber and a negative chamber; two porous carbon electrodes of a liquid-permeable type disposed respectively in the positive and negative chambers; and positive and negative electrolytic solutions, the positive and negative electrolytic solutions being circulated respectively into the positive and negative chambers such that an oxidation-reduction reaction occurs and causes charging and discharging, wherein the permeable membrane is defined by the following requirement (a), and each of the positive and negative solutions is defined by the following requirement (b):

(a) an ion-exchange membrane including as an ion exchange layer a polymeric pellicle which results from crosslinking of a halogenated alkylated product of an aromatic polysulfone type polymer with use of a polyamine and which has an ion exchange capacity of 0.3 to 0.8 (milliequivalent/gram of dry resin) and a thickness 0.1 to 120 μm, the polysulfone type polymer having as a recurring unit a group represented at least by the following formula (I); and

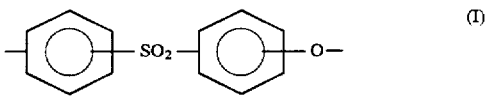

(b) an electrolytic solution having a vanadium ion concentration of 0.5 to 8 mols/liter.

BRIEF DESCRIPTION OF THE DRAWING

The accompanying drawing is a schematic view explanatory of a single cell used to provide the battery according to the present invention.

DESCRIPTION OF THE PREFERRED EMBODIMENTS

Figure 1:
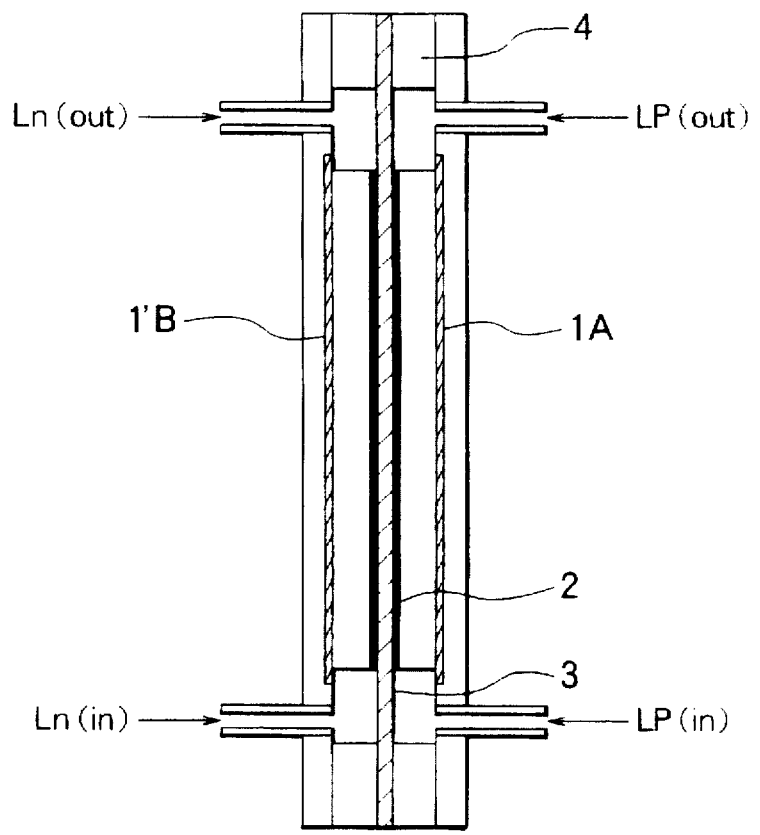

An ion-exchange membrane for use in the present invention is comprised of an ion exchanger layer. This layer is formed of a polymeric pellicle or thin film derived by crosslinking a halogenated alkylated product or polymer of an aromatic polysulfone type polymer with a polyamine. The polysulfone type polymer noted here has as a recurring unit a group represented at least by the following formula (I).

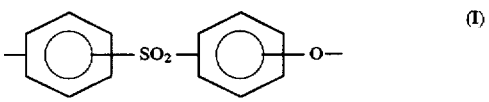

Aromatic polysulfone type polymers used herein are those having a structure represented by the formula (II) below.

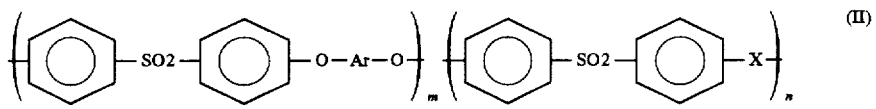

In the formula (II), m and n each are a positive integer preferably of 2 to 370, more preferably of 3 to 350, still more preferably of 4 to 300, especially preferably of 5 to 200, and most preferably of 6 to 180. The ratio of m to n (m/n) is preferably in the range of 1/20 to 150/1, more preferably of 1/10 to 100/1, still more preferably of 1/8 to 50/1, especially preferably of 1/5 to 10/1, and most preferably of 1/3 to 8/1.

Ar is a substituent denoted by either one group of the following formulae (III) to (VI).

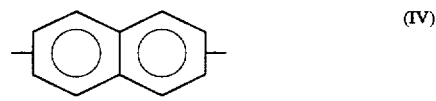

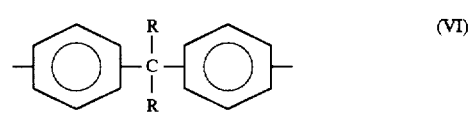

In the formula (VI), R is an alkyl group, preferably of 1 to 3 in carbon number, more preferably of 1 or 2 in carbon number, still more preferably a methyl group, and a phenyl group may contain any optional substituent which is chosen from an alkyl group of 1 to 3 in carbon number, more preferably from an alkyl group of 1 or 2 in carbon number, still more preferably from a methyl group, wherein an unsaturated phenyl group is particularly preferred.

X is a substituent selected from —O—, —S— or $SO_2$.

The intrinsic viscosity of the aromatic polysulfone type polymer having the group of the formula (I) is preferably in the range of 0.1 to 1.0, more preferably of 0.2 to 0.95, still more preferably of 0.3 to 0.90, especially preferably of 0.4 to 0.85, most preferably of 0.5 to 0.80.

A halogenated alkylated product or polymer of such aromatic polysulfone type polymer is obtainable from a halogenation-alkylation reaction, preferably from a chloromethylation reaction.

The chloromethylation reaction may be performed by reaction of a given aromatic polysulfone type polymer with a chloromethylating agent such as chloromethyl methyl ether or the like in the presence of a catalyst such as tin chloride or the like.

The content of a halogenated alkyl group in the resultant halogenated alkylated product of the aromatic polysulfone type polymer needs to be adjusted in its ion exchange capacity to range from 0.3 to 8.0 (milliequivalent/gram of dry resin) during a subsequent crosslinking reaction with a polyamine.

The aromatic polysulfone type polymer thus halogenated and alkylated may be crosslinked with a polyamine wherein at least two amines of a primary to tertiary class are bonded to one molecule.

Suitable polyamines include ethylene diamine, diethylene triamine, triethylene tetraamine, tetraethylene pentaamine, polyethylene imine, phenylene diamine, N,N,N'N'- tetramethyldiaminomethane, N,N,N'N'-tetramethyl-1,2-diaminoethane, N,N,N'N'-tetramethyl-1,3-diamino-propane, N,N,N'N'-tetramethylbenzidine, polyvinyl pyridine, polychloromethyl styrene and the like. Particularly preferred among these polyamines is a diamine having attached to its terminal molecule two tertiary amines represented by the following formula (VII).

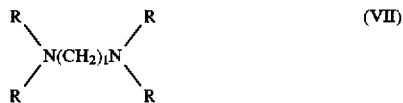

In the formula (VII), R is an alkyl group, and l is an positive integer. A specific example of the above diamine is typified by N,N,N'N'-tetramethyl-1,3-diamino-propane.

In forming a polymeric pellicle, through crosslinkage with a given polyamine, from a given aromatic polysulfone type polymer having been halogenated and alkylated as already stated, there may be employed a method in which a selected aromatic polysulfone type polymer is halogenated and alkylated to form a pellicle, followed by crosslinking of the pellicle with a selected polyamine, and a method in which a selected aromatic polysulfone type polymer is formed into a pellicle, followed by halogenation and alkylation of the pellicle and by subsequent crosslinkage of the same with a selected polyamine.

Also possibly, a given aromatic polysulfone type polymer may be halogenated and alkylated and further reacted with a limited amount of a monoamine to thereby form a pellicle wherein halogenated alkyl group-containing sites have been aminated, followed by crosslinking of the pellicle with a given polyamine.

The ion-exchange membrane useful in the present invention is comprised of, as an ion exchanger layer, a polymeric pellicle with an ion exchange capacity of 0.3 to 8.0 (milliequivalent/gram of dry resin). The ion exchange capacity ranges preferably from 0.5 to 6.0 (milli-equivalent/gram of dry resin), more preferably from 0.6 to 5.0 (milliequivalent/gram of dry resin), still more preferably of 0.8 to 4.5 (milliequivalent/gram of dry resin), especially preferably below the range of 1.0 to 4.0 (milliequivalent/gram of dry resin), most preferably from 1.2 to 3.5 (milliequivalent/gram of dry resin).

The ion exchanger layer used for the ion-exchange membrane used herein should be prepared by crosslinking one selected halogenated alkylated product of the aromatic polysulfone type polymer with one selected polyamine, and the ion exchange capacity of such layer should be set at from 0.3 to 8.0 (milliequivalent/gram of dry resin). With this specific ion exchange layer employed in a permeable membrane for an all-vanadium battery of a redox flow type, it is ensured that current efficiency and power efficiency are enhanced and that vanadium ions, anions derived therefrom and water used as a solvent are prevented from migrating due to charging and discharging, from one of positive to negative or negative to positive electrodes through a permeable membrane, and thus, that charging and discharging can be performed for a noticeably increased number of cycles.

Various advantages afforded by the battery of the present invention are not attainable even where the aromatic polysulfone type polymer specified hereinbefore is aminated without any crosslinkage with a polyamine, to have introduced therein ion exchange groups.

Ion exchange capacities smaller than 0.3 (milliequivalent/gram of dry resin) result in reduced current efficiency and decreased power efficiency and further cause vanadium ions, anions derived therefrom and water used as a solvent to migrate excessively, as a result of charging and discharging, from one of positive to negative or negative to positive electrodes through a permeable membrane, thus impairing prolonged cycle of charge/discharge cycles.

Conversely, ion exchange capacities greater than 8.0 (milliequivalent/gram of dry resin) give rise to an ion exchanger layer with insufficient mechanical strength and lead to increased cell resistance and decreased power efficiency.

The ion exchanger layer of the ion-exchange membrane used herein should preferably be crosslinked with a given polyamine to such an extent as to become insoluble in a solvent for example of dimethyl sulfoxide, dimethylformamide or the like.

Such ion exchanger layer is a polymeric pellite usually of 0.1 to 120 μm in thickness. The thickness is preferably in the range of 0.5 to 100 μm, more preferably of 1.0 to 90 μm, still more preferably of 1.0 to 80 μm, especially preferably of 1.5 to 70 μm, most preferably of 2.0 to 60 μm.

If the ion exchanger layer is formed to be less than 0.1 μm in thickness it will cause responsible lowered current efficiency and reduced power efficiency and also increased migration of vanadium ions, anions derived therefrom and water used as a solvent, as a result of charging and discharging, from one of positive to negative or negative to positive electrodes through a permeable membrane, hence marred performance in the charging/discharging cycles.

Thicknesses exceeding 120 μm in the ion exchanger layer involve increased cell resistance and decreased power efficiency.

To implement the present invention, it is preferred that the ion exchanger layer for use in the ion-exchange membrane be formed on a substrate layer made substantially free from ion exchange groups and having a thickness of 1.0 to 250 μm. Below 1.0 μm in the thickness of the substrate layer is not effective for obtaining an ion-exchange membrane with sufficient mechanical strength, whereas above 250 μm leads in some cases to undesirably high cell resistance of the finished battery.

Also preferably, the ion exchanger layer should be formed on a porous film resulting from a polyolefin or a polyfluoroolefin and having a thickness of 1.0 to 250 μm. This porous film should range in porosity from 20 to 90% and have pore walls that are hydrophilic in nature. The porosity mentioned here is more preferably in the range of 30 to 80%, especially preferably 35 to 75%, and most preferably 40 to 70%. Porosities below 20% show an adverse rise in cell resistance, while those above 90% result in the formation of an ion-exchange membrane having mechanical weakness.

The thickness of the ion exchanger layer of the ion-exchange membrane is preferably from 2.0 to 150 μm, more preferably from 3.0 to 100 μm, especially preferably from 3.0 to 70 μm, and most preferably from 5.0 to 50 μm.

The average particle diameters of the above polyolefin and polyfluoroolefin are usually in the range of 0.01 to 10 μm, preferably 0.02 to 5 μm, and more preferably 0.03 to 4.5 μm.

Polyolefins used herein are selected from those of a hydrocarbon class such as polyethylene, polypropylene, poly-4-methylpentene-1 and the like.

Eligible polyfluoroolefins include polyvinylidene fluoride, polytetrafluoroethylene, copolymers of hexafluoropropylene and tetrafluoroethylene, copolymers of fluoroolefins and olefins of a hydrocarbon class and the like.

The ion exchanger layer for use in the ion-exchange membrane used herein may also preferably be disposed on a nonwoven fabric formed of a polyolefin. In such instance, the fabric should have a thickness already specified.

In order to render the porous film hydrophilic, several methods may be employed which include, for example, one wherein a given porous film is allowed to adsorb a hydrophilic group-containing ionomeric or polymeric material, or to react with the latter, one wherein such a porous film is treated on its surface with chlorosulfonic acid, ozone or the like, and one wherein such a porous film is impregnated with an ionic surfactant, followed by treatment of the film with a polymer having contained in its backbone chain an ionic charge opposite to that of the film.

The ion-exchange membrane used herein may further preferably be formed on a translucent film of ionic conductivity and of the same thickness as in the above porous film. Ionic-conductive films are chosen suitably from hydrous polymer films such as those derivable from hydrated cellulose, cellulose acetate, cellulose regenerated by a copper-ammonia method, polyvinyl alcohol and the like, specific examples of which are typified for instance by Cellophane and Vinylon (both registered trademarks).

The ion-exchange membrane used herein can also be constituted with a given ion exchanger layer containing ion exchange groups and a given porous film formed virtually free of those groups. To this end, the averaged ion exchange capacity of the ion-exchange membrane is preferably from 0.3 to 5.0 (milliequivalent/gram of dry resin), more preferably from 0.4 to 1.5 (milliequivalent/gram of dry resin), still more preferably from 0.5 to 4.0 (milliequivalent/gram of dry resin), especially preferably from 0.6 to 3.5 (milliequivalent/gram of dry resin), and most preferably from 0.8 to 3.0 (milliequivalent/gram of dry resin).

The thickness of the ion-exchange membrane is set to be preferably in the range of 2.0 to 500 μm, more preferably 10.0 to 400 μm, still more preferably 15.0 to 350 μm, especially preferably of 20.0 to 300 μm, and most preferably 30.0 to 250 μm.

The thickness ratio of ion exchanger layer to ion-exchange membrane is preferably from 0.05 to 0.8, more preferably from 0.07 to 0.7, still more preferably from 0.08 to 0.6, and especially preferably from 0.1 to 0.5.

The weight ratio of ion exchanger layer to ion-exchange membrane is preferably from 0.05 to 0.9, more preferably from 0.07 to 0.8, still more preferably from 0.08 to 0.7, and especially preferably from 0.1 to 0.6.

Electrolytic solutions for use in the battery of the present invention are aqueous solutions with a vanadium concentration of 0.5 to 8.0 mols/liter, preferably 0.6 to 6.0 mols/liter, more preferably 0.8 to 5.0 mols/liter, still more preferably 1.0 to 4.5 mols/liter, especially preferably 1.2 to 4.0 mols/liter, and most preferably 1.5 to 3.5 mols/liter.

Vanadium concentrations below 0.5 mol/liter lead to lowered battery energy, and those above 8.0 mols/liter make the resultant electrolytic solution highly viscous and moreover cause increased cell resistance and decreased power efficiency.

An aqueous solution containing sulfuric acid and vanadium is rather preferred as an electrolytic solution, which aqueous solution has a sulfate group contained preferably in a concentration of 0.5 to 9.0 mols/liter, more preferably 0.8 to 8.5 mols/liter, still more preferably 1.0 to 8.0 mols/liter, especially preferably 1.2 to 7.0 mol/liter, and most preferably 1.5 to 6.0 mols/liter.

In the battery provided in accordance with the present invention, an electrolytic solution for use in a positive electrode can take the form of a mixture of tetravalent and pentavalent vanadium ions or of a pentavalent vanadium ion alone when in a charged state. More preferred, however, is an aqueous solution having a pentavalent vanadium ion contained in a concentration of 0.5 to 7.5 mols/liter, more preferably 0.6 to 5.5 mols/liter, still more preferably 0.8 to 4.5 mols/liter, still more preferably 1.0 to 4.0 mols/liter, especially preferably 1.2 to 3.8 mols/liter, and most preferably 1.5 to 3.5 mols/liter, the vanadium ion concentration specified here being expressed as such in an electrolytic solution of the positive electrode when charging is brought to an end.

With regard to an electrolytic solution in the positive electrode after the termination of charging, the concentration ratio of pentavalent vanadium ion to total vanadium ion is preferably in the range of 50 to 100%, more preferably 60 to 99%, still more preferably 65 to 98%, especially preferably 70 to 97%, and most preferably 75 to 96%.

According to the battery of the present invention, an electrolytic solution for use in a positive electrode can be in the form of a mixture of tetravalent and pentavalent vanadium ions, of a tetravalent vanadium ion alone, or of a mixture of tetravalent and trivalent vanadium ions when in a discharged state. However, an aqueous solution is more preferred which has a tetravalent vanadium ion contained in a concentration of not larger than the range of 0.5 to 7.5 mols/liter, preferably 0.6 to 5.5 mols/liter, more preferably 0.8 to 4.5 mols/liter, still more preferably 1.0 to 4.0 mols/liter, especially preferably 1.2 to 3.8 mols/liter, and most preferably 1.5 to 3.5 mols/liter, the vanadium ion concentration stated here being expressed as such in an electrolytic solution of the positive electrode when discharging is brought to an end. As regards the electrolytic solution in the positive electrode in a discharged state, the concentration ratio of tetravalent vanadium ion to total vanadium ion is preferably in the range of 50 to 100%, more preferably 60 to 99%, still more preferably 65 to 98%, especially preferably 70 to 97%, and most preferably 75 to 96%.

Also as regards the electrolytic solution in the positive electrode while in a discharged state, the concentration ratio of trivalent vanadium ion to total vanadium ion is preferably not greater than 30%, more preferably below 25%, still more preferably below 20%, especially preferably below 10%, and most preferably below 5%.

Carbon for use in a porous carbon electrode of a liquid-permeable type used in the present invention has a lattice spacing ($d_{002}$) on a plane (002) ranging preferably from 3.37 to 3.80 Å.

The above lattice spacing ($d_{002}$) is more preferably in the range of 3.40 to 3.78 Å, still more preferably 3.45 to 3.76 Å, especially preferably 3.48 to 3.75 Å, and most preferably 3.50 to 3.70 Å, as determined by wide-angle X-ray diffractometry.

Less than 3.37 Å in the lattice spacing leads to lowered electrode reactivity of the resulting carbon electrode. Inversely, more than 3.70 Å involves an objectionable rise in electrical resistance of the carbon electrode and in cell resistance of the battery.

Furthermore, the carbon used herein and defined above has a crystal size (Lc) of preferably not exceeding 180 Å, preferably below 150 Å, still more preferably below 100 Å, especially preferably 8 to 70 Å, more especially preferably of 8 to 50 Å, and most preferably 9 to 35 Å, as determined in a C-axis direction by means of wide-angle X-ray diffractometry.

The C-axis crystal size (Lc) if made beyond 180 Å contributes to reduced electrode reactivity of the resulting carbon which is thereafter used to form two carbon layers.

The porous carbon electrode of a liquid-permeable type for use in the present invention has a surface area set to be preferably in the range of 0.5 to 2,000 m²/g, more preferably 1 to 1,500 m²/g, still more preferably 5 to 1,000 m²/g, especially preferably 7 to 500 m²/g, and most preferably 10 to 100 m²/g.

Too small a specific surface area results in lowered rate of electrode reactivity with consequential difficulty in charging and discharging at elevated current density. Too large a specific surface area also makes the electrode mechanically weak.

The porous carbon electrode of a liquid-permeable type used herein has a bulk density set to be preferably in the range of 0.04 to 0.80 g/cc, more preferably 0.05 to 0.70 g/cc, still more preferably 0.06 to 0.60 g/cc, especially preferably 0.07 to 0.50 g/cc, and most preferably 0.08 to 0.40 g/cc.

Bulk densities smaller than 0.04 g/cc bring about reduced mechanical strength of the electrode and increased cell resistance of the battery. Above 0.80 g/cc in the bulk density is responsible for a large loss of pressure during passage of the electrolytic solution through the electrode.

The porous carbon electrode of a liquid-permeable type used herein has a true density set to be preferably in the range of 0.80 to 2.10 g/cc, more preferably 0.90 to 2.05 g/cc, still more preferably 1.00 to 2.00 g/cc, especially preferably 1.10 to 1.95 g/cc, and most preferably 1.15 to 1.90 g/cc.

Too large a true density renders the finished electrode less reactive on a surface thereof. The true density if being made excessively small brings about insufficient electrical conductivity, thus making charging and discharging difficult at high current densities.

The porous carbon electrode of a liquid-permeable type used herein has an atomic ratio of oxygen atom to carbon atom on a surface thereof (O/C) in the range of 0.02 to 0.50. The atomic ratio (O/C) is preferably from 0.03 to 0.40, more preferably from 0.04 to 0.35, especially preferably from 0.05 to 0.30, and most preferably from 0.06 to 0.20.

The porous carbon electrode of a liquid-permeable type used herein has an atomic ratio of hydrogen atom to carbon atom preferably in the range of 0.02 to 0.50, more preferably 0.03 to 0.45, still more preferably 0.04 to 0.40, especially preferably 0.05 to 0.35, and most preferably from 0.08 to 0.30.

In the practice of the present invention, the porous carbon electrode of a liquid-permeable type can be of a fibrous carbon molding such as of a felt-like, cord fabric-like or knit fabric-like form, or of a porous carbon molding of a sheet-like form.

Carbon fibers for use in the formation of fibrous carbon moldings have a fiber diameter of 0.5 to 35 μm, preferably 0.8 to 30 μm, more preferably 1 to 25 μm, still more preferably 2 to 20 μm, especially preferably not larger than the range of 3 to 15 μm, and most preferably 5 to 12 μm. Too small a fiber diameter leads to a mechanically weak carbon fiber, and too great a fiber diameter results in impaired flexibility of the resulting fiber.

The battery of a redox flow type according to the present invention is comprised of at least one cell structure wherein positive and negative poles each provided with a porous carbon electrode of a liquid-permeable type are held in separated relation to each other by a permeable membrane disposed therebetween, and two current collectors are positioned respectively on a side of the carbon electrode near to the permeable membrane and on the opposite side of the former electrode remote from the latter membrane. The thickness of the carbon electrode thus interposed between and by the permeable membrane and the current collectors is preferably in the range of 0.3 to 10 mm, more preferably 0.4 to 8 mm, still more preferably 0.5 to 5 mm, especially preferably 0.6 to 3 mm, and most preferably 0.7 to 2.5 mm.

If the thickness of the carbon electrode so arranged is below 0.3 mm, then increased resistance is adversely exerted in circulating an electrolytic solution in an amount needed to charge and discharge the battery; that is, pumping power is required to a great degree. Above 10 mm in thickness shows a rise in cell resistance and a decline in power efficiency.

The porous carbon electrode of a liquid-permeable type used herein can be grooved on its surface in order to facilitate flow of the electrolytic solution used. Grooving may be made preferably on the carbon electrode surface on a side of the permeable membrane.

The current collectors each can also be provided with grooves to further facilitate flow of the electrolytic solution. In such instance, the grooves may be formed on the current collector surface on a side of the carbon electrode.

The electrode reaction contemplated under the present invention will now be explained using an all-vanadium redox flow type battery by way of example.

As shown in the accompanying drawing, a single cell used to constitute the battery is of a structure having porous carbon electrodes of a liquid-permeable type disposed on both sides of two collector electrodes A and B and of a permeable membrane. These constituent parts are held in pressed sandwiched relation between the collector electrodes A and B so as to provide two chambers partitioned by the permeable membrane, one chamber being used to receive a positive electrolytic solution and the other to receive a negative electrolytic solution. The thickness of each such chamber is maintained as desired by arrangement of a suitable spacer. The positive electrolytic solution composed of $V^{4+}/V^{5+}$ is circulated into the positive electrode chamber, while the negative electrolytic solution composed of $V^{3+}/V^{2+}$ is circulated into the negative electrode chamber. Thus, a redox battery is provided. In the case of a redox flow type battery, ions are liberated to oxidize $V^{4+}$ into $V^{5+}$ in a positive electrode chamber during charging. The ions thus liberated are then supplied via an outer circuit in a negative electrode chamber where $V^{3+}$ is reduced to $V^{2+}$ by the action of the ions supplied. Owing to this oxidation-reduction reaction, hydrogen ions H+ become excessive in the positive electrode chamber and inversely insufficient in the negative electrode chamber. Here, the permeable membrane allows excess hydrogen $H^+$ in the positive electrode chamber to selectively migrate into the negative electrode chamber, thereby making the system electrically neutral on the whole. Discharging undergoes a reaction opposite to that of charging.

In the foregoing electrode reaction, power efficiency is expressed by the following equation.

power efficiency (%)=(discharged power/charged power)×100

The discharged power in this equation depends on the internal resistance in a cell, the ion selectivity of a permeable membrane, the loss of a shunt current and other parameters. A decrease in internal resistance is taken to mean an improvement in voltage efficiency, whereas a rise in ion selectivity and a decline in shunt current loss stand for improved current efficiency.

In accordance with the present invention, a new redox flow type battery is provided with diminished cell resistance and enhanced power efficiency in the redox cell as well as prolonged charge/discharge cycle.

EXAMPLES

With reference to the following examples, the present invention will be further described below in greater detail.

Example 1

An aromatic polysulfone type polymer (intrinsic viscosity: 0.66) of a structure represented by the following formula (VIII) was reacted with chloromethyl methyl ether used as a chloromethylating agent in the presence of tin chloride used as a catalyst, whereby a chloromethylated polysulfone type polymer was prepared.

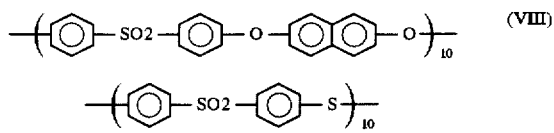
(VIII)

The above polymer was molded into a 20 μm thick film, followed by crosslinking of the film with N,N,N',N'-tetramethyl-1,3-diaminopropane. Thus, an ion-exchange membrane was obtained which was composed of an aromatic polysulfone type polymer. The ion exchange capacity of this ion-exchange membrane was 2.5 (milli-equivalent/gram of dry resin).

A felt formed of a cellulosic fibrous carbon was employed as a porous carbon electrode of a liquid-permeable type. The fiber diameter of the carbon fiber was 12 μm, and the carbon electrode had a lattice spacing ($d_{002}$) on a plane (002) of 3.50 Å as measured by wide-angle X-ray diffractometry and a surface area of 29.5 m$^2$/g as measured by BET on nitrogen. The atom composition on the surface of the carbon fiber [atomic ratio of oxygen atom to carbon atom (O/C)] was determined by ESCA or by X-ray spectrophotometry to be 0.102 in terms of atomic ratio (O/C).

A redox flow type battery was produced, as seen in the accompanying drawing, by use of the above-prepared ion-exchange membrane as a permeable membrane and of the above-prepared fibrous carbon felt as a porous carbon electrode of a liquid-permeable type.

A set of test conditions were used with the thickness of both the positive and negative electrode chambers being 3 mm the area of the porous carbon electrode to be placed in each such chamber being 10 cm$^2$, the thickness of fibrous carbon felt being 3.0 mm and the bulk density of such felt being 0.098 g/cc.

The electrolytic solution used was an aqueous solution having a total vanadium concentration of 2 mols/liter and a total sulfate group concentration of 4 mols/liter.

Charging and discharging tests were effected with the results tabulated below.

Comparative Example 1

The procedure of Example 1 was followed except for use of an ion-exchange membrane derived from alkylation of a styrene-divinyl benzene copolymer and having a thickness of 140 μm and an ion exchange capacity of 2.2 (milli-equivalent/gram of dry resin).

Charging and discharging tests were conducted with the results tabulated below.

Comparative Example 2

The procedure of Example 1 was followed except for use of an ion-exchange membrane derived from amination of an aromatic polysulfone type polymer and having an ion exchange capacity of 1.8 (milliequivalent/gram of dry resin).

Charging and discharging tests were conducted with the results tabulated below.

TABLE 1

| | 8th Cycle | | | | | |
|---|---|---|---|---|---|---|
| | Current density mA/cm$^2$ | Current efficiency % | Voltage efficiency % | Power efficiency % | Cell resistance cm$^2$ | Amount of migrated liquid ml |
| Example 1 | 60 | 97.8 | 85.8 | 83.9 | 1.6 | 1.7 |
| Comparative example 1 | 60 | 93.6 | 77.9 | 72.9 | 3.0 | 4.0 |
| Comparative example 2 | 60 | 89.5 | 87.5 | 78.3 | 1.4 | 12 |

As is clear from the tabulated results, the redox flow type battery representing the present invention provides increased current efficiency and enhanced power efficiency, and besides, reduces the amount of liquid migrating between the positive and negative electrode chambers even after completion of the 8th charge/discharge cycles, hence showing prolonged cycle performance as compared to the comparative batteries tested.

What is claimed is:

1. A liquid-circulating battery comprising: a positive electrode chamber; a negative electrode chamber; a permeable membrane interposed between said positive and negative electrode chambers to separate said positive chamber and said negative chamber; a first and a second porous liquid-permeable carbon electrodes disposed respectively in said positive and negative chambers; and a positive and a negative electrolytic solutions, said positive and negative electrolytic solutions being circulated respectively into said positive and negative chambers such that an oxidation-reduction reaction occurs and causes charging and discharging, wherein said permeable membrane is defined by the following requirement (a), and each of said positive and negative electrolytic solutions is defined by the following requirement (b):

(a) an ion-exchange membrane including as an ion-exchanger layer a polymeric pellicle which results from crosslinking of a halogenated alkylated product of an aromatic polysulfone polymer with use of a polyamine and which has an ion exchange capacity of 0.3 to 8.0 milliequivalent/gram of dry resin and a thickness of 0.1 to 120 μm, said polysulfone polymer having as a recurring unit at least a group represented by the following formula (I); and

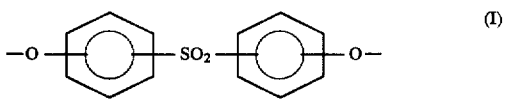
(I)

(b) an electrolytic solution having a vanadium ion concentration of 0.5 to 8 mols/liter.

2. The battery according to claim 1, wherein each of said positive and negative electrolytic solutions has a sulfate group contained in a concentration of 0.5 to 9.0 mols/liter.

3. The battery according to claim 1 or 2, wherein said ion exchanger layer is disposed on a substrate layer formed substantially free from ion exchange groups and having a thickness of 1.0 to 250 μm.

4. The battery according to claim 3, wherein said ion exchanger layer is disposed on a porous substrate layer formed of a polyolefin or a polyfluoroolefin and having a porosity of 20 to 90%.

5. The battery according to claim 3, wherein said ion exchanger layer is disposed on a nonwoven fabric formed of a polyolefin.

6. The battery according to claim 3, wherein said ion exchanger layer is disposed on a translucent film having ionic conductivity.

7. The battery according to claim 1, wherein each of said first and second porous liquid-permeable carbon electrodes has a bulk density of 0.04 to 0.8 g/cc.

8. The battery according to claim 1, which further includes at least one cell structure having two current collectors positioned respectively on a side of said first and second porous liquid-permeable carbon electrode near to said permeable membrane and on the opposite side of the former electrode remote from the latter membrane, said porous carbon electrode being interposed between and by said permeable membrane and said current collectors and has a thickness of 0.3 to 10 mm.

9. A method of making the liquid-circulating battery of claim 1 comprising:

separating said positive electrode chamber from said negative electrode chamber by placing said permeable membrane between said positive and said negative electrode chambers.

10. The method of making the liquid-circulating battery of claim 9, further comprising:

placing said first porous liquid-permeable carbon electrode in said positive electrode chamber and said second porous liquid-permeable carbon electrode in said negative electrode chamber.

11. The method of making the liquid-circulating battery of claim 10, further comprising:

filling said positive electrode chamber with said positive electrolytic solution and said negative electrode chamber with said negative electrolytic solution.

12. A liquid-circulating battery of claim 1 prepared by a process comprising:

filling said positive electrode chamber with said positive electrolytic solution and said negative electrode chamber with said negative electrolytic solution.

13. The liquid-circulating battery of claim 12, wherein said process further comprises:

separating said positive electrode chamber from said negative electrode chamber by placing said permeable membrane between said positive and the negative electrode chambers.

14. The liquid-circulating battery of claim 13, wherein said process further comprises:

placing said first porous liquid-permeable carbon electrode in said positive electrode chamber and said second porous liquid-permeable carbon electrode in said negative electrode chamber.

15. A battery comprising:

a positive electrode chamber, a negative electrode chamber, a permeable membrane interposed between said positive and negative electrode chambers to separate said positive chamber and said negative chamber, a first and a second porous liquid-permeable carbon electrodes disposed respectively in said positive and negative chambers;

wherein said permeable membrane is an ion-exchange membrane comprising a polymeric pellicle as an ion-exchanger layer which results from crosslinking of a halogenated alkylated product of an aromatic polysulfone polymer with use of a polyamine, wherein the ion-exchange membrane has an ion exchange capacity of 0.3 to 0.8 milliequivalent/gram of dry resin and a thickness of 0.1 to 120 μm and, said polysulfone polymer has as a recurring unit at least a group represented by the following formula (I):

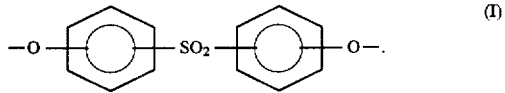

16. The battery according to claim 15, wherein said ion exchanger layer is disposed on a substrate layer formed substantially free from ion exchange groups and having a thickness of 1.0 to 250 μm.

17. The battery according to claim 15, wherein said ion exchanger layer is disposed on a porous substrate layer formed of a polyolefin or a polyfluoroolefin and having a porosity of 20 to 90%.

18. The battery according to claim 15, wherein said ion exchanger layer is disposed on a nonwoven fabric formed of a polyolefin.

19. The battery according to claim 15, wherein said ion exchanger layer is disposed on a translucent film having ionic conductivity.

20. The battery according to claim 15, wherein each of said first and second porous liquid-permeable carbon electrodes has a bulk density of 0.4 to 0.8 g/cc.

* * * * *